(12) United States Patent
Kalandyk et al.

(10) Patent No.: US 11,681,758 B2
(45) Date of Patent: Jun. 20, 2023

(54) BOT PROGRAM FOR MONITORING

(71) Applicant: International Business Machines Corporation, Armonk, NY (US)

(72) Inventors: Piotr Kalandyk, Zielonki (PL); Grzegorz Piotr Szczepanik, Cracow (PL); Michal Maciej Zalas, Cracow (PL); Pawel Tadeusz Januszek, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 17/239,638

(22) Filed: Apr. 25, 2021

(65) Prior Publication Data

US 2022/0342938 A1 Oct. 27, 2022

(51) Int. Cl.
*G06F 16/903* (2019.01)
*G06N 5/02* (2023.01)

(52) U.S. Cl.
CPC ......... *G06F 16/90335* (2019.01); *G06N 5/02* (2013.01)

(58) Field of Classification Search
None
See application file for complete search history.

(56) References Cited

U.S. PATENT DOCUMENTS

| | | | | |
|---|---|---|---|---|
| 10,839,432 B1 * | 11/2020 | Konig | .................. | G06Q 30/016 |
| 2002/0059164 A1 * | 5/2002 | Shtivelman | ............. | H04L 51/04 |
| 2017/0324867 A1 * | 11/2017 | Tamblyn | ............. | H04L 65/1093 |
| 2018/0131643 A1 | 5/2018 | Trufinescu | | |
| 2020/0007474 A1 | 1/2020 | Zhang | | |
| 2021/0182942 A1 * | 6/2021 | Bikumala | ............. | G06F 40/205 |
| 2021/0334593 A1 * | 10/2021 | Vo | .......................... | G06N 7/005 |
| 2022/0179881 A1 * | 6/2022 | Chan | ................... | G06F 11/3476 |

FOREIGN PATENT DOCUMENTS

| | | |
|---|---|---|
| CN | 115238047 A | 10/2022 |
| JP | 2022168316 A | 11/2022 |
| WO | 2019245943 A1 | 12/2019 |
| WO | WO-2020263417 A1 * 12/2020 .......... G06F 11/3636 |

OTHER PUBLICATIONS

"Chatbot: Dynamic Question Generator Based on Temporal User Constraints", IP.com Prior Art Database; IPCOM000259749D; Sep. 13, 2019, 4 pps., <https://priorart.ip.com/IPCOM/000259749>.
Mell et al., "The NIST Definition of Cloud Computing", National Institute of Standards and Technology, U.S. Department of Commerce, NIST Special Publication 800-145, Sep. 2011, 7 pages.

* cited by examiner

*Primary Examiner* — Uyen T Le
(74) *Attorney, Agent, or Firm* — Gilbert Harmon, Jr.; Christopher Pignato (57) ABSTRACT

Processing user queries using a bot program by executing a bot program, wherein executing the bot program further comprises: processing output data of an application program; detecting status messages in the output data; generating bot queries related to the status messages; providing the bot queries to a user, in response to the providing of the bot queries to the user, receiving a user query from the user, wherein the user query is based at least in part on the bot queries, determining one or more solutions to the user query using a knowledge base, and applying a selected solution of the solutions.

20 Claims, 7 Drawing Sheets

BOT PROGRAM FOR MONITORING

BACKGROUND

The present invention relates to the field of digital computer systems, and more specifically, to a method for processing user queries using a bot program.

A chatbot is a software application used to conduct an on-line chat conversation via text or text-to-speech, in lieu of providing direct contact with a user. However, chatbots may require continuous tuning and testing especially if the inputs provided by the users are not controlled.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable processing user queries using a bot program.

Aspects of the invention disclose methods, systems and computer readable media associated with processing user queries using a bot program by executing a bot program, wherein executing the bot program further comprises: processing output data of an application program; detecting status messages in the output data; generating bot queries related to the status messages; providing the bot queries to a user, in response to the providing of the bot queries to the user, receiving a user query from the user, wherein the user query is based at least in part on the bot queries, determining one or more solutions to the user query using a knowledge base, and applying a selected solution of the solutions.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The application program can, for example be a monitoring application program. The monitoring application program may a computer program. The status message can be a status of a system whose operation is controlled by the application program. The status message can be an error message, warning message or a message that provides some knowledge. The application program can perform a task e.g., a monitoring task. The task can comprise observing, regulating, controlling, and/or verifying the operations of one or more data-processing systems. The task can, for example, perform one or more controls. Different types of controls can be performed. For example, the control may measure how well the security of the data processing system conforms to a set of established standards criteria. Different types of the application program can be provided depending on the type of control that is performed by the application program. The application program can be configured to provide output data indicative of a result of the task. The output data can regularly be provided by the application program. For example, the application program can be an online monitoring program that continuously or regularly performs the monitoring task. In another example, the application program can perform the monitoring task offline. In one example, the output data can be displayed on an application user interface of the application program. The output data can be displayed in one or more panels on the application user interface. The application user interface can, for example, comprise a dashboard. The output data can comprise, for example, values of particular key performance indicators (KPIs), operation status of one or more computers of the data processing system, etc.

However, application programs such as monitoring programs can be so complex that output data of the application programs cannot be understood by users. Investigating and fixing those issues can be a big part of the work of the users. The present embodiments of the invention make use of bot programs to help users investigating and/or fixing identified issues in the output data. The bot program is a computer program. Before investigating or fixing an issue, the bot program receives a user query or user input and uses natural language processing (NLP) to understand the user query. However, if the user query is not correctly formulated, then the bot program may not understand the user query, and either cannot provide an answer, or provides an incorrect answer to the user query, due to the nature of limitations of natural language processing technologies. For example, the user may not know how to describe the issue e.g., the user may provide too many specifics which may be unimportant for the issue that may mislead the inference algorithm of the bot program. The present embodiment of the present invention solves this issue by controlling the formulation of the user queries or assisting the user to formulate the queries. As a result, providing a technical advantage by enabling the bot program to provide accurate solutions based on technical decisions that may be made e.g., the technical decision may require changes to the configuration of the data processing system based on the solutions provided by the bot program. Thus, the present embodiment of the invention prevents misconfiguration of data processing systems, waste of processing resources, and prevents potential disaster that a misconfiguration may cause.

Another advantage of the present embodiment of the invention is anticipating any received queries from the user by preparing in advance bot queries based on the output data. As a result, saving processing time by presenting the user with suggested bot queries so that the initial user query can be appropriate.

In an embodiment, the processing of output data comprises: providing a calls database comprising data on different types of applications, wherein the data of a specific type of application comprises procedures of the specific type of application and predefined queries associated with tokens associated with the specific type of application, performing a recognition of a type of the running application program, searching in the calls database for procedures associated with the recognized type, and analysing the output data based on the procedures.

For example, the calls database can include entries associated with different types of application programs. Each entry of the entries can include procedures of the type of application programs represented by the entry. The entry may further include pairs of queries and tokens, wherein the tokens represent status messages of the type of application programs represented by the entry. For example, if the status message comprises: "There is no data in computer A", then the calls database may comprise tokens "no data" and "computer A", each of the tokens being associated with one or more queries. The tokens and the associated queries may be historical data that is collected based on previously processed issues of the data processing systems. For example, the calls database can be updated by the present method by storing the tokens of the detected status messages in association with the generated bot queries and/or with the user query received by the bot program.

The application program can be configured to perform one or more controls, wherein each control can be performed using a respective one or more procedures. For example, the control of the quality, accuracy, completeness, etc. of input data of the data processing system may be associated with data input procedures. In this embodiment, the data input procedures are processed in order to understand the check process of the input data. Also, determining whether output data that results from said control comprises a status message and if so, indicate which type of status messages.

This embodiment can be advantageous by increasing the accuracy of the queries and resulting respective solutions.

In an embodiment, generating the bot queries comprises: tokenizing the detected status messages and retrieving from the calls database the queries associated with the tokens, wherein the generated bot queries are the retrieved queries. This embodiment can be advantageous by making use of previously gained experiences, which can be particularly advantageous as most of the status messages and problems may be recurrent over time.

In an embodiment, the bot program can be configured to access an application program interface of the application program, wherein generating the bot queries comprises: generating candidate bot queries related to the detected status messages, and specifying the candidate bot queries in accordance with functions and/or requests of the application programming interface, wherein the generated bot queries are the specified candidate bot queries.

For example, the bot program can have access to a history of calls of the functions and/or requests of the application programming interface. The candidate bot queries can be compared with this history of calls in order to identify possible modifications of the candidate bot queries in accordance with the calls e.g., the modification may consist of adding one or more words to the candidate bot query. This embodiment may further increase the accuracy of the generated bot queries and resulting respective solutions.

In an embodiment, the method further comprises: receiving by the bot program an initial user query from the user, prompting the user to confirm that the user query takes into account the bot queries, wherein the user query is received in response to the prompting, the user query being the initial user query or a modification of the initial user query. This can particularly be advantageous by informing or reminding the user of the existence of template queries provided by the bot program. The user can improve the initial query if the initial query is unspecific compared to the suggested bot queries. In this way, the suggested and applied solutions are accurate.

In an embodiment, the method further comprises: displaying the output data in an application user interface on a display, displaying the bot queries in a bot dialog window on the display, the bot dialog window and the application user interface being concurrently displayed, wherein the user query is received via the bot dialog window.

In an embodiment, the application user interface comprises any one of: a panel, and a dashboard, wherein the processing of the output data comprises processing the displayed output data using the application user interface, which can enable atomization of the monitoring of the content of the application user interface. Additionally, enabling the bot program to anticipate and provide bot queries for a given status message before the user notices the status message. Once the user notices the status message, the user can immediately use the suggested bot queries, which can speed up the process of checking the data processing system.

In an embodiment, the bot query is a query to find a root cause of the status message or a query to provide details of the status message. The query can, for example, be a question. In one example, the bot query can be a specific query that can be used as it is by the user to ask questions. In another example, the bot query can be a template or generic question that the user may adapt to the status message he has detected.

In an embodiment, the executing of the bot program comprises: the receiving of the user query, the determining of the solutions, and the application of the selected solution. As a result, this can be advantageous as a single execution of the bot program can be used for both building questions and communicating with the user to provide solutions to user detected issues.

In an embodiment, the method further comprises launching a user-bot chat session, wherein the receiving of the user query, the determining of the solutions and the application of the selected solution is performed during the session. In one example, the bot program can first be executed to build the questions. Another execution of the bot program can be performed to launch the user-bot chat session e.g., the other execution may be performed in response to a user request of the user. This can be advantageous as the bot program can detect status messages and build questions in milliseconds, while the user may need much more time to analyze the output data and notice a status message. During the time window defined by the difference of the error detection times, the bot program can be switched off to save resources according to this embodiment.

In an embodiment, the bot program is embedded in the application program.

In an embodiment, the application program is a client in a client-server configuration involving an application server connected to the client, wherein the application program is configured to output data using a service of the application server, and the bot program is a client in a client-server configuration involving a bot server connected to the bot program, wherein the bot program performs the method using one or more services of the bot server.

In an embodiment, the method further comprises storing the bot queries in a calls database in association with the detected status messages, enabling continuous updating or filling of the calls database.

In an embodiment, the method further comprises repeating the method for the same application program or for other applications, thereby updating the calls database.

In an embodiment, providing the bot queries further comprises providing further bot queries of the calls database of applications similar to the application program.

In an embodiment, the application program is any one of: asset management application and network management application. Additionally, determining the type of the application program, so that the processing of the output data can be adapted accordingly, can be advantageous. For example, the status message of a network management application can have different formats compared to status messages of another type of applications.

Figure 1:
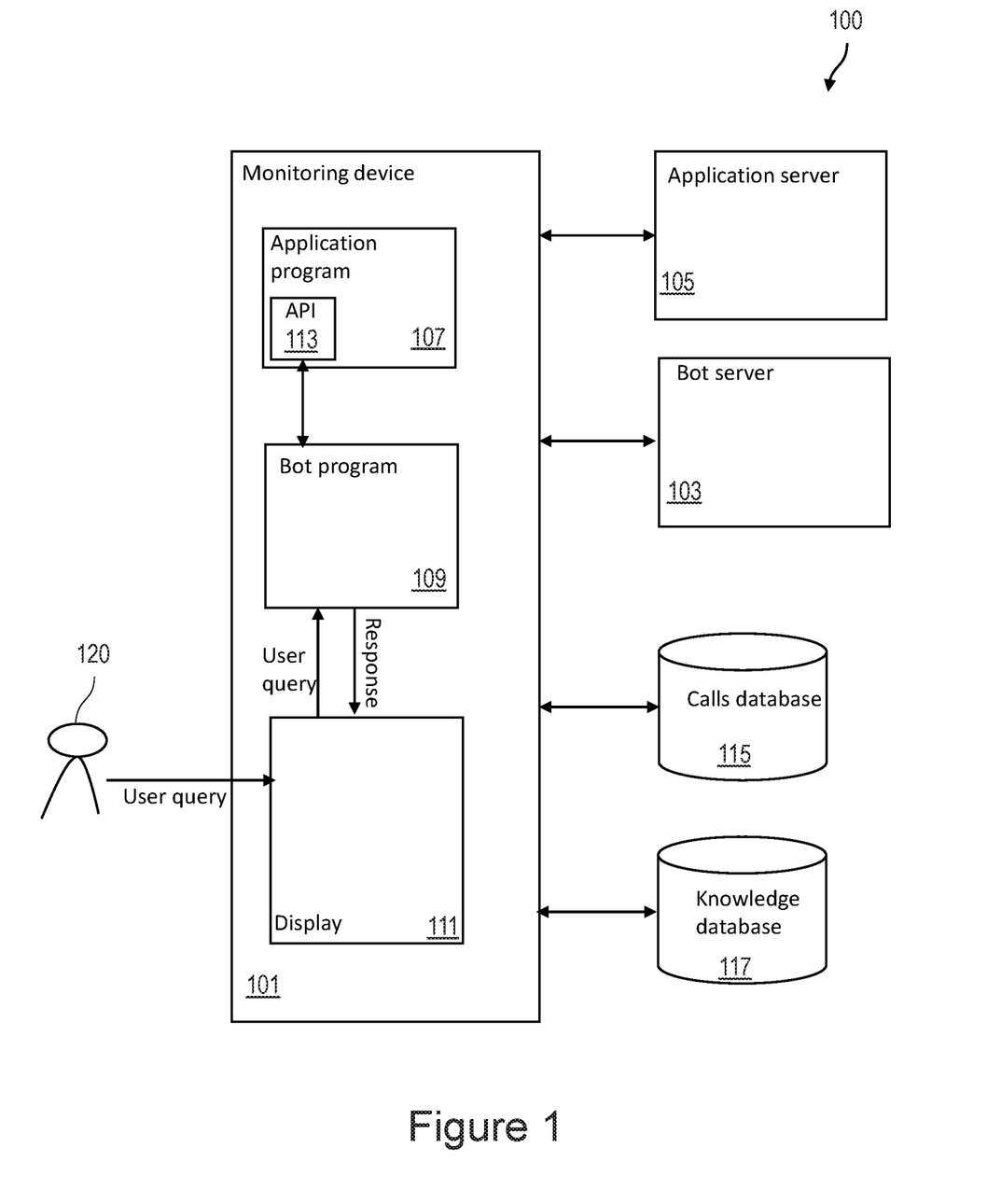
FIG. 1 provides a schematic illustration of a computing environment, according to an embodiment of the invention.

FIG. 1 is a schematic illustration of a computing environment 100 in accordance with an example of an embodiment of the invention.

The present invention may contain various accessible data sources, such as calls database 115 and knowledge base 117, that may include personal data, content, or information the user wishes not to be processed. Personal data includes personally identifying information, or sensitive personal information, as well as user information, such as tracking or geolocation information. Processing refers to any, automated or unautomated, operation, or set of operations, such as collection, recording, organization, structuring, storage, adaptation, alteration, retrieval, consultation, use, disclosure by transmission, dissemination, or otherwise making available, combination, restriction, erasure, or destruction performed on personal data. Application server 105 enables the authorized and secure processing of personal data. Application server 105 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Application server 105 provides information regarding personal data and the nature (e.g., type, scope, purpose, duration, etc.) of the processing. Application server 105 provides the user with copies of stored personal data. Application server 105 allows the correction or completion of incorrect or incomplete personal data. Application server 105 allows the immediate deletion of personal data.

The computing environment 100 includes a monitoring device 101, bot server 103, and application server 105. The monitoring device 101 may, for example, be a desktop computing device, a smart display, a tablet computing device, a laptop computing device, or other suitable form of client computing devices. The bot server 103 may be provided as a single server device or multiple server devices operating in a cloud computing configuration. The application server 105 may be provided as a single server device or multiple server devices operating in the cloud computing configuration. Although shown as separate components, the bot server 103 and the application server 105 can, in another example, be implemented on the same server.

The monitoring device 101 can be configured to communicate via a communication network with the bot server 103 and the application server 105. The communication network can include, for example, the Internet, a local area network, a wide area network and/or a wireless network. The monitoring device 101 comprises a bot program 109 and an application program 107 such as a monitoring application program. The application program 107 comprises instructions that, when executed, generate an application user interface on a display device 111. The application program 107 can be configured to display on the application user interface output data indicative of results of predefined controls. The objectives of these controls can, for example, be to ensure the appropriate development and implementation of applications, the integrity of program and data files and of computer operations. These controls can, for example, comprise the system development life cycle controls, the program change management controls, physical security controls over the data processing system, computer operation controls, etc. Each of the controls can be performed using one or more procedures. The application program 107 provides an application programming interface (API) 113. The bot program 109 comprises instructions that, when executed, perform at least part of the present embodiment of the invention. For example, the bot program 109 comprises instructions that, when executed, generate on the display device 111 a conversation canvas. The conversation canvas comprises a graphical user interface that displays the dialog, including user queries from the user 120, and responses determined by the bot program 109. The application user interface and the conversation canvas can be displayed concurrently. The bot program 109 can access the application program interface 113 of the application program 107, and determine calls performed via the API 113. In one example, the bot program 109 is a separate program executed separately from the application program 107. In another example, the bot program 109 is a module of the application program 107 that can be executed concurrently with the application program 107 e.g., the bot program 109 can be embedded in the application program 107. The bot program 109 can have access to a calls database 115 and knowledge base 117. The calls database 115 comprises data on different types of applications. The data of a specific type of applications comprises procedures of the specific type of applications and predefined queries associated with tokens associated with the specific type of applications. If for example, the type of the application is a network management application, the data stored for that type in the calls database 115 can comprise procedures that control the network function such as the network traffic and queries related to network issues, wherein the queries are associated with tokens related to network status messages.

Figure 2:
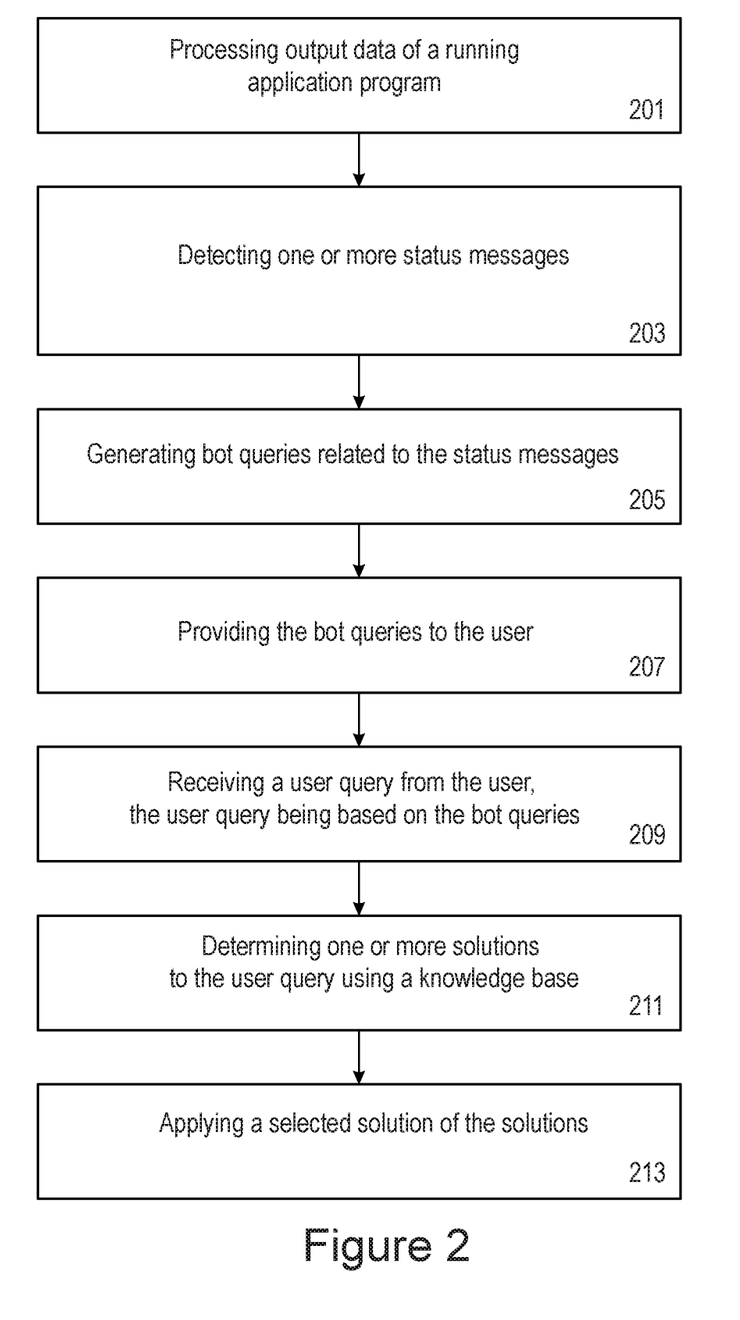
FIG. 2 provides a flowchart depicting an operational sequence for processing user queries using a bot program, according to an embodiment of the invention.

FIG. 2 is a flowchart of a method for processing user queries using a bot program in accordance with an example of the present embodiment of the invention. For the purpose of explanation, the method described in FIG. 2 can be implemented in the system illustrated in FIG. 1 but is not limited to this implementation. The method of FIG. 2 can, for example, be performed by the monitoring device 101.

In an embodiment, the method processes output data of a running application program 107 in step 201. For example, the method can utilize the bot program 109 to process the output data while the application program 107 executes. In this example, the bot program 109 can automatically be launched upon starting execution of the application program 107. As a result, the method enables a continuous assistance to the users. In another example, the bot program 109 can be launched any time during the execution of the application program 107. As a result, the method provides on-demand assistance via the bot program 109.

The output data can, for example, comprise values of attributes, wherein the attributes are descriptive of the results of the controls being performed by the application program 107 e.g., one attribute may be named "accessible" indicating whether a computer is accessible or not accessible. By reading the value of the attribute "accessible" associated with a given computer, the bot program 109 can determine whether the computer is accessible or not. In one scenario, if the computer is not accessible, then the value of the attribute "accessible" may be considered as a status message. The output data can, in another example, further comprise the values of one or more KPIs, wherein each of the KPIs is associated with a flag or another indicator to indicate whether the value of the KPI is a normal value or an erroneous/problematic value. By reading the indicator associated with each of the KPIs, the bot program may determine whether a problem exists related to the KPI. The value of the indicator may be considered as a status message if the value of the associated KPI is not as expected. In another example, the output data may display messages indicating the status of each of the controls, wherein in case of a problem detected by a control a status message can be provided. The status message can include a certain format (e.g., starting with the word "ERROR" in case of an error message). In this scenario, the bot program 109 can parse the displayed messages and search for messages that start with "ERROR".

In one example, the bot program 109 utilizes the procedures of the controls being performed to determine whether any displayed information associated with each of the controls is an error or not. For example, the bot program 109 can parse the code of the procedure to identify output calls or output functions and identify the messages that are status messages e.g., using an NLP technique. Additionally, by comparing the output data with those identified messages, the bot program 109 can determine whether there is a status message or not.

In an embodiment, the method detects one or more status messages in the output data in step 203. The status message can be an error message, warning message, or a message that provides some knowledge. In one scenario, for each detected status message, the user may need to find a solution or at least understand the status message. In this scenario, the user may communicate with the bot program 109 and ask questions related to the status message in order to obtain responses. However, formulating questions that can be processed by a computer presents a challenging task as the user may provide insufficient details e.g., either provide too few details or provide more details which are irrelevant for the status message. The present embodiment of the invention solves this issue by anticipating the user queries and providing suggestions. For that, the method enables the bot program 109 to generate one or more bot queries related to each of the detected status messages in step 205.

In one first query determination example, the method utilizes the bot program 109 to tokenize the detected status messages into tokens. In this example, the method utilizes the bot program 109 to search each of the tokens in the calls database 115 in order to identify the queries which are associated with the tokens. The method utilizes the identified queries as the generated queries of step 205.

In one second query determination example, the method utilizes the bot program 109 to considers the output procedures associated with the status messages to infer the bot queries e.g., using NLP techniques. In this example, the bot program 109 can compare the documentation or comments associated with the output procedures in order to generate the bot queries.

In an embodiment, the method provides the bot queries to the user in step 207. The bot queries can, for example, be displayed on the same application user interface or on a separate conversation window of the bot program 109. The bot queries can be provided in association with the respective status messages. In this way, the user has access to the status messages and to the suggested bot queries. As a result, the user can thus formulate the user query more precisely that can be more efficiently processed by the bot program 109.

In an embodiment, in response to the providing of the bot queries to the user in step 207, the method utilizes the bot program 109 to receive in step 209 a user query from the user, wherein the user query is based on the bot queries of step 205. For example, the user query may be related to each detected status message of the status messages detected by the bot program 109 (i.e., the user has detected the same status messages as the ones detected by the bot program 109). In another example, the user query may relate to a subset of the detected status messages e.g., the user may have only noticed or understood that part of the detected status messages are indeed status messages. In both cases, the user query may be a question to understand the status message or find a root cause and thus a solution of the status message.

In an embodiment, the method utilizes the bot program 109 to determine one or more solutions to the user query using a knowledge base in step 211. For example, the bot program 109 may use a natural language understanding (NLU), natural language generation (NLG), machine learning, deep learning or other artificial techniques to determine the solutions.

In an embodiment, the method utilizes the bot program 109 to apply at least one selected solution of the solutions in step 213. In one example, the method provides a prompt to the user to select at least one solution of the solutions. In response to the prompting the bot program 109 may receive a selection of the at least one solution. In another example, the bot program 109 can automatically select one of the solutions e.g., the bot program 109 may use different kinds of selection algorithms, including a selection algorithm for choosing the most commonly provided solution, or for a random selection of one of the solutions.

Figure 3:
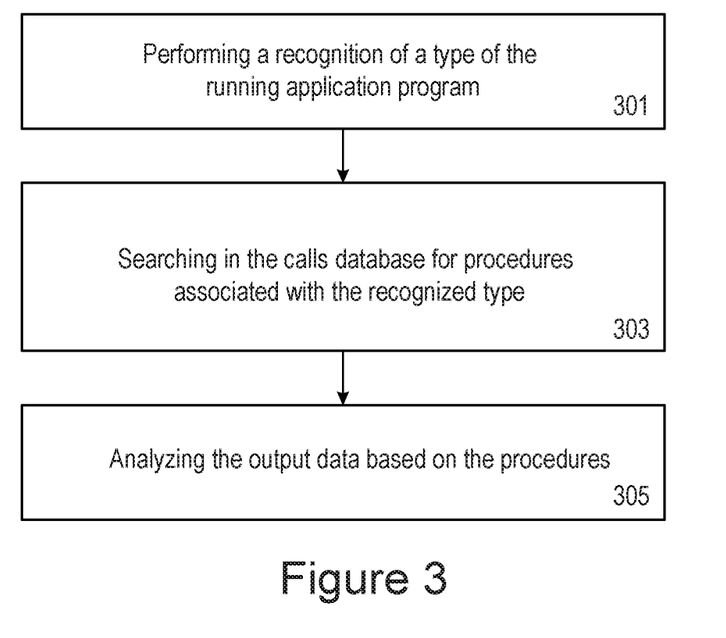
FIG. 3 provides a flowchart depicting an operational sequence for processing output data of a running monitoring application program, according to an embodiment of the invention.

FIG. 3 is a flowchart of a method for processing output data of a running monitoring application program in accordance with an example of the present embodiment of the invention. For the purpose of explanation, the method described in FIG. 3 can be implemented in the system illustrated in FIG. 1 but is not limited to this implementation. The method of FIG. 3 can, for example, be performed by the monitoring device 101.

In an embodiment, the method utilizes the bot program 109 to determine a type of the running monitoring application program in step 301. In one example, the bot program 109 can use application metadata descriptive of the monitoring application program (e.g., application 107) in order to determine the type of the monitoring application program. In another example, the bot program 109 can recognize the user interface features of the application user interface displayed by the monitoring application program. The user interface features may indicate the type of the monitoring application program e.g., the bot program 109 may recognize a panel of the monitoring application program as "application for license management—dashboard", indicating that the monitoring application program is an asset management application.

In an embodiment, the method searches in step 303 the calls database 115 for procedures associated with the recognized type. The procedures can, for example, comprise an input procedure that checks whether input data is accurate, complete, and correct. The procedures can, for example, comprise an output procedure that checks whether outputs are accurate and complete. Each of the procedures can output messages indicating the result of processing. These messages can comprise status messages. Each type of messages can have a format. For example, the status message can have a format e.g., that starts with the word "ERROR". By analysing these procedures and/or their metadata, the method can utilize the bot program 109 to identify the formats of the status messages and/or error codes associated with different errors.

In an embodiment, the method analyses the output data in step 305 based on the procedures. For example, the method utilizes the bot program 109 to search for messages in the application user interface that have a format of status messages of the determined procedures. The bot program can, in another example, search for error codes in the application user interface.

Figure 4:
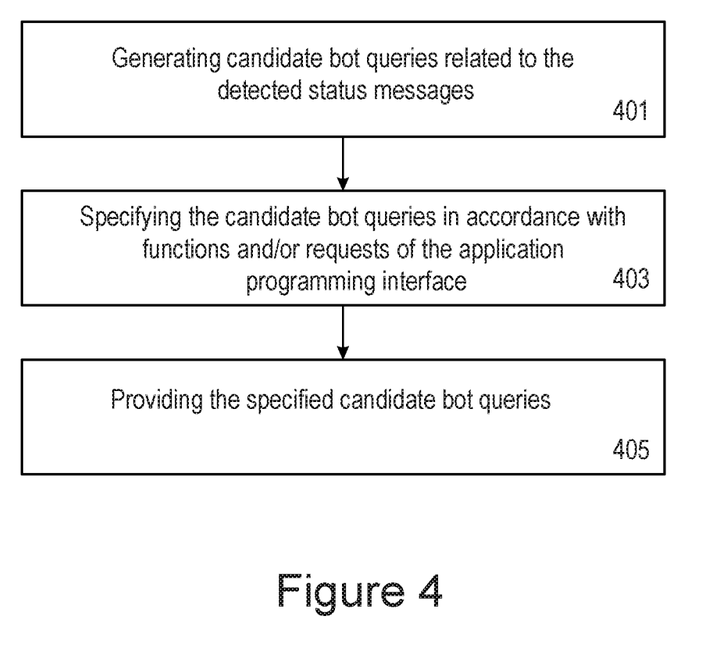
FIG. 4 provides a flowchart depicting an operational sequence for generating bot queries, according to an embodiment of the invention.

FIG. 4 is a flowchart of a method for generating bot queries in accordance with an example of the present embodiments of the invention. For the purpose of explanation, the method described in FIG. 4 can be implemented in the system illustrated in FIG. 1 but is not limited to this implementation. The method of FIG. 4 can, for example, be performed by the monitoring device 101.

In an embodiment, the method generates candidate bot queries related to the detected status messages in step 401. For example, the candidate bot queries can, for example, be determined as described with reference to FIG. 2 by tokenizing the detected status messages, wherein the candidate bot queries may be the queries associated with these tokens in the calls database 115. For example, if the detected status message indicates "There is no data in computer A", then the tokens may comprise "No data" and "computer A". The search in the calls database 115 for possible questions for the tokens may identify the following candidate bot queries: "How to check if software scan has completed", "How to check last successful import date", "How to check if XXX is up and running".

In an embodiment, the method specifies the candidate bot queries in step 403 in accordance with functions and/or requests of the application programming interface. Following the above examples, the three queries may be specified as follows. In one scenario, since the API has previously checked if computer A runs Windows, then the query "How to check if software scan has completed" can be specified to become "How to check if software scan has completed on Windows". In another scenario, since the API has previously checked whether computer A belongs to Computer Group X, then the query "How to check last successful import date" can be specified to become "How to check last successful import date for Computer Group X". In another scenario, since the API has previously checked that computer A runs APP agent, the query "How to check if XXX is up and running" can be specified to become "How to check if APP agent is up and running".

In an embodiment, the method provides the specified candidate bot queries in step 405. For example, the method utilizes the bot program 109 to display the specified candidate bot queries on the application user interface or on the conversation window.

Figure 5:
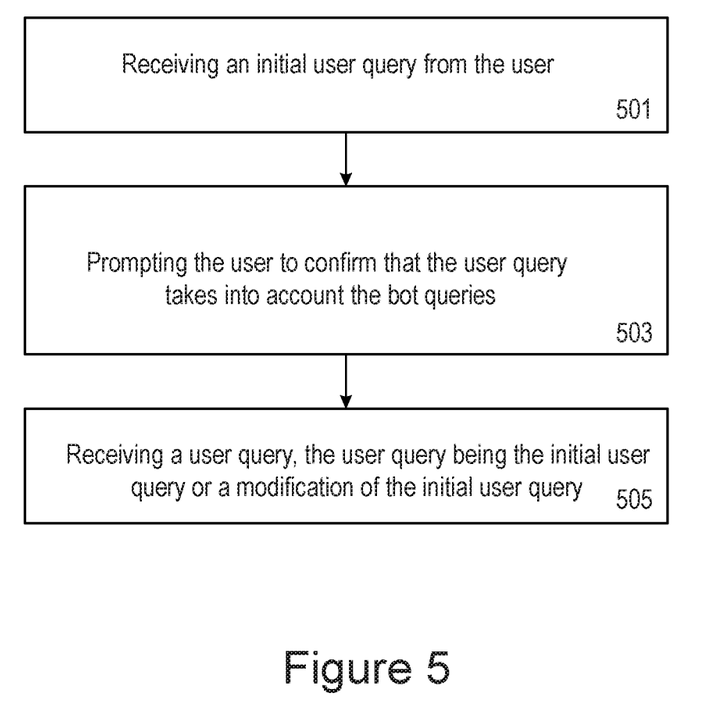
FIG. 5 provides a flowchart depicting an operational sequence for controlling user queries, according to an embodiment of the invention.

FIG. 5 is a flowchart of a method for controlling user queries in accordance with an example of the present embodiments of the invention. For the purpose of explanation, the method described in FIG. 5 can be implemented in the system illustrated in FIG. 1 but is not limited to this implementation. The method of FIG. 5 can, for example, be performed by the monitoring device 101.

In an embodiment, the method receives an initial user query from the user in step 501. Following the example of FIG. 4, the user may choose the question "How to check if software scan has completed on Windows" and modifies the question in order to start conversation with the bot program 109. In this scenario, the user knows that the computer A runs Windows 2012 since the machine is managed by the user, the question may be refined as follows: "How to check if software scan has completed on Windows 2012?".

In an embodiment, in step 503 the method prompts the user to confirm that the user query takes into account the bot queries e.g., as defined in FIG. 4. This can be advantageous as the user may not have seen the bot queries provided by the bot program 109.

In an embodiment, in step 505 the method receives a user query in response to the prompting. The user query may be the initial user query or a modification of the initial user query. For example, the user can change the initial query if it appears that the suggested queries are more accurately formulated. The user can however confirm that the initial query is indeed accurate e.g., because he already used the bot queries for the formulation of the initial query.

Following the above example, the method can find a solution to the question "How to check if software scan has completed on Windows 2012?". In this example, the bot program 109 may, for example, provide three links (L1, L2 and L3) to documentation which may answer user's question: L1) Known "no data" scan error on Windows 2012, L2) Software scan output verification and L3) Health check procedure for agent running on Windows.

Figure 6:
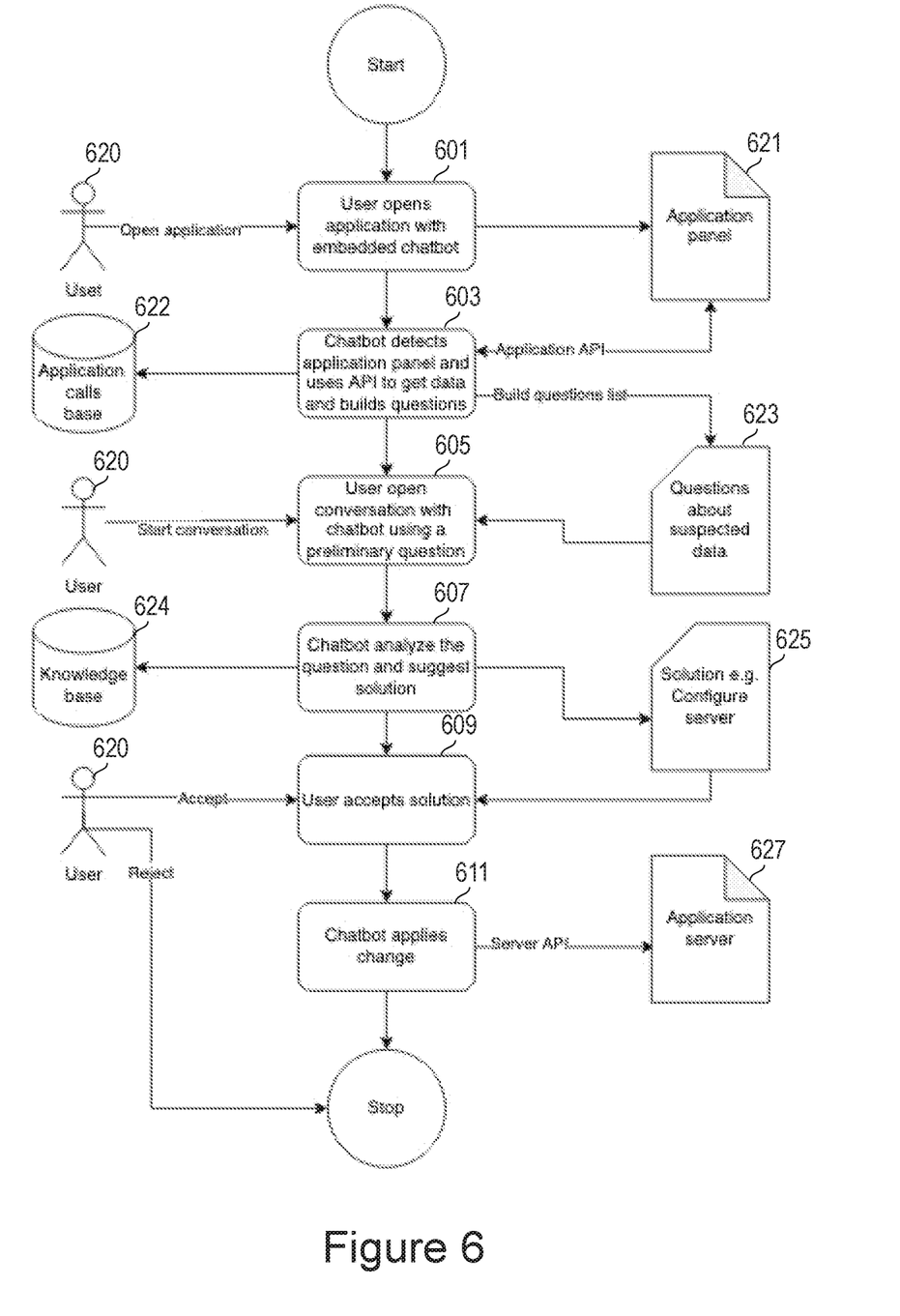
FIG. 6 provides a flowchart depicting an operational sequence for processing user queries using a bot program, according to an embodiment of the invention.

FIG. 6 is a flowchart of a method for processing user queries using a bot program in accordance with an example of the present embodiment of the invention. For the purpose of explanation, the method described in FIG. 6 can be implemented in the system illustrated in FIG. 1 but is not limited to this implementation.

In step 601 the user 620 opens the application program 107. The bot program 109 may be embedded in the application program 107. This step can result in displaying application panel 621. In step 603 the bot program 109 (also referred to as chatbot) detects the application panel 621. In step 603 the bot program 109 can use the application API (e.g., API 113) of the application program 107 to process output data of the application program 107 and builds question list 623 using the calls database 622. The built question list 623 can be provided to the user 620. In step 605 the user 620 can open conversation with the bot program 109 using a preliminary question. In step 607 the bot program 109 can analyse the preliminary question and suggest to the user 620 one or more solutions 625 using the knowledge base 624. The solution can, for example, be to configure the application server 627. The user 620 can select solutions among the suggested solutions or confirm suggested solutions in step 609. In step 611 the bot program 109 can apply the selected or confirmed solutions e.g., by configuring the application server 627.

Figure 7:
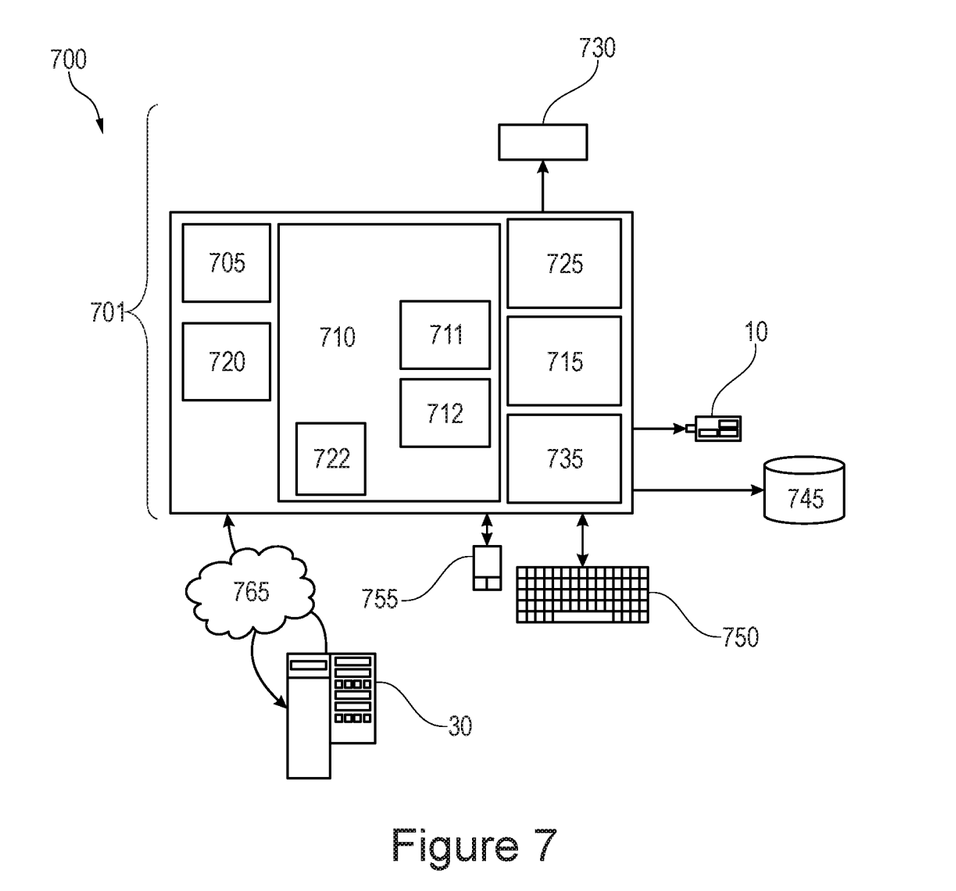
FIG. 7 depicts a computerized system, suited for implementing one or more method steps, according to an embodiment of the invention.

FIG. 7 represents a general computerized system 700 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 712, 722 (including firmware 722), hardware (processor) 705, or a combination thereof. In exemplary embodiments, the methods described herein are implemented in software, as an executable program, and is executed by a special or general-purpose digital computer, such as a personal computer, workstation, minicomputer, or mainframe computer. The most general system 700 therefore includes a general-purpose computer 701.

In exemplary embodiments, in terms of hardware architecture, as shown in FIG. 7, the computer 701 includes a processor 705, memory (main memory) 710 coupled to a memory controller 715, and one or more input and/or output (I/O) devices (or peripherals) 10, 745 that are communicatively coupled via a local input/output controller 735. The input/output controller 735 can be, but is not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 745 may generally include any generalized cryptographic card or smart card known in the art.

The processor 705 is a hardware device for executing software, particularly that stored in memory 710. The processor 705 can be any custom made or commercially available processor, a central processing unit (CPU), an auxiliary processor among several processors associated with the computer 701, a semiconductor-based microprocessor (in the form of a microchip or chip set), or generally any device for executing software instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 710 can have a distributed architecture, where various components are situated remote from one another, but can be accessed by the processor 705.

The software in memory 710 may include one or more separate programs, each of which comprises an ordered listing of executable instructions for implementing logical functions, notably functions involved in embodiments of this invention. In the example of FIG. 7, software in the memory 710 includes instructions 712 e.g. instructions to manage databases such as a database management system.

The software in memory 710 shall also typically include a suitable operating system (OS) 711. The OS 711 essentially controls the execution of other computer programs, such as possibly software 712 for implementing methods as described herein.

The methods described herein may be in the form of a source program 712, executable program 712 (object code), script, or any other entity comprising a set of instructions 712 to be performed. When a source program, then the program needs to be translated via a compiler, assembler, interpreter, or the like, which may or may not be included within the memory 710, so as to operate properly in connection with the OS 711. Furthermore, the methods can be written as an object-oriented programming language, which has classes of data and methods, or a procedure programming language, which has routines, subroutines, and/or functions.

In exemplary embodiments, a conventional keyboard 750 and mouse 755 can be coupled to the input/output controller 735. Other output devices such as the I/O devices 745 may include input devices, for example but not limited to a printer, a scanner, microphone, and the like. Finally, the I/O devices 10, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 745 can be any generalized cryptographic card or smart card known in the art. The system 700 can further include a display controller 725 coupled to a display 730. In exemplary embodiments, the system 700 can further include a network interface for coupling to a network 765. The network 765 can be an IP-based network for communication between the computer 701 and any external server, client and the like via a broadband connection. The network 765 transmits and receives data between the computer 701 and external systems 30, which can be involved to perform part, or all of the steps of the methods discussed herein. In exemplary embodiments, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network W(LAN), a wireless wide area network (WWAN) a personal area network (PAN), a virtual private network (VPN), intranet or other suitable network system and includes equipment for receiving and transmitting signals.

If the computer 701 is a PC, workstation, intelligent device or the like, the software in the memory 710 may further include a basic input output system (BIOS) 722. The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to execute software 712 stored within the memory 710, to communicate data to and from the memory 710, and to generally control operations of the computer 701 pursuant to the software. The methods described herein and the OS 711, in whole or in part, but typically the latter, are read by the processor 705, possibly buffered within the processor 705, and then executed.

When the systems and methods described herein are implemented in software 712, as is shown in FIG. 7, the methods can be stored on any computer readable medium, such as storage 720, for use by or in connection with any computer related system or method. The storage 720 may comprise a disk storage such as HDD storage.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
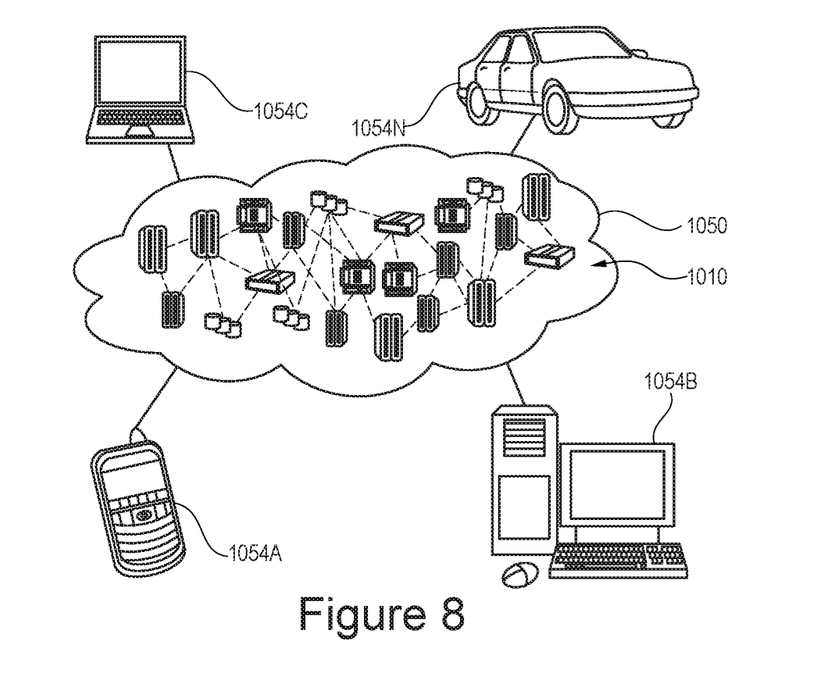
FIG. 8 depicts a cloud computing environment according to an embodiment of the present invention.

Referring now to FIG. 8, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 8 are intended to be illustrative only and that computing nodes 1010 and cloud computing environment 1050 can communicate with any type of computerized device over any type of network and/or network addressable connection (e.g., using a web browser).

Figure 9:
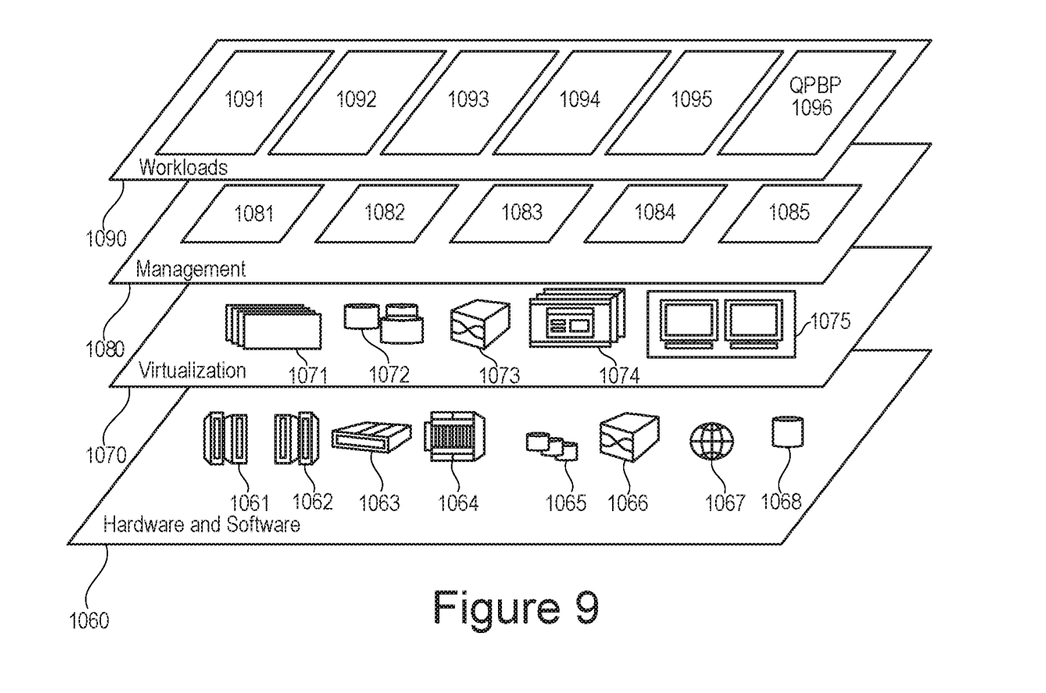
FIG. 9 depicts abstraction model layers, according to an embodiment of the invention.

Referring now to FIG. 9, a set of functional abstraction layers provided by cloud computing environment 1050 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and query processing by a bot program (QPBP) 1096 in accordance with the present subject matter e.g., as described with reference to FIG. 2, 3, 4, 5 or 6.

The present subject matter may comprise the following clauses.

Clause 1. A computer-implemented method comprising: executing a bot program comprising: processing output data of a running application program; detecting status messages in the output data; generating bot queries related to the status messages; providing the bot queries to a user; in response to the providing of the bot queries to the user, receiving by the bot program a user query from the user, the user query being based on the bot queries; determining by the both program one or more solutions to the user query using a knowledge base; applying by the bot program a selected solution of the solutions.

Clause 2. The method of clause 1, wherein the processing of output data comprises: providing a calls database comprising data on different types of applications, wherein the data of a specific type of applications comprises procedures of the specific type of applications and predefined queries associated with tokens associated with the specific type of applications; performing a recognition of a type of the running application program; searching in the calls database for procedures associated with the recognized type; analyzing the output data based on the procedures.

Clause 3. The method of clause 2, wherein generating the bot queries comprises: tokenizing the detected status messages and retrieving from the call database the queries associated with the tokens, wherein the generated bot queries are the retrieved queries.

Clause 4. The method of any of the preceding clauses 1 to 3, the bot program being configured to access an application program interface of the application program, wherein generating the bot queries comprises: generating candidate bot queries related to the detected status messages; specifying the candidate bot queries in accordance with functions and/or requests of the application programming interface; wherein the generated bot queries are the specified candidate bot queries.

Clause 5. The method of any of the preceding clauses 1 to 4, further comprising: receiving by the bot program an initial user query from the user; prompting the user to confirm that the user query takes into account the bot queries; wherein the user query is received in response to the prompting, the user query being the initial user query or a modification of the initial user query.

Clause 6. The method of any of the preceding clauses 1 to 5, further comprising: displaying the output data in an application user interface on a display; displaying the bot queries in a bot dialog window on the display, the bot dialog window and the application user interface being concurrently displayed; wherein the user query is received via the bot dialog window.

Clause 7. The method of clause 6, the application user interface comprising any one of: a panel, and a dashboard, wherein the processing of the output data comprises processing the displayed output data using the application user interface.

Clause 8. The method of any of the preceding clauses 1 to 7, the bot query being a query to find a root cause of the status message or a query to provide details of the status message.

Clause 9. The method of any of the preceding clauses 1 to 8, the executing of the bot program comprising: the receiving of the user query, the determining of the solutions and the application of the selected solution.

Clause 10. The method of any of the preceding clauses 1 to 8, further comprising launching a user-bot chat session, wherein the receiving of the user query, the determining of the solutions and the application of the selected the solution is performed during the session.

Clause 11. The method of any of the preceding clauses 1 to 10, the bot program being embedded in the application program.

Clause 12. The method of any of the preceding clauses 1 to 11, the application program being a client in a client-server configuration involving an application server connected to the client, wherein the application program is configured to output data using a service of the application server; and the bot program being a client in a client-server configuration involving a bot server connected to the bot program, wherein the bot program performs the method using one or more services of the bot server.

Clause 13. The method of any of the preceding clauses 2 to 12, further comprising storing the bot queries in the calls database.

Clause 14. The method of clause 13, further comprising repeating the method for the same application program or for other applications, thereby updating the bot database.

Clause 15. The method of clause 14, wherein providing the bot queries further comprises providing from the calls database further bot queries of applications similar to the application program.

Clause 16. The method of any of the preceding clauses 1 to 15, the application program being any one of: asset management application and network management application.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for processing user queries using a bot program, the method comprising:
    processing, by the bot program, the output data of an application program;
    detecting, by the bot program, status messages in the output data;
    tokenizing, by the bot program, the status messages detected by the bot program from the output data of the application program into a plurality of tokens;
    searching, by the bot program, each of the plurality of tokens within a calls database to identify one or more queries associated with the plurality of tokens;
    generating, by the bot program, bot queries related to the status messages from the one or more queries identified as being associated with the plurality of tokens;
    providing, by the bot program, the bot queries to a user;
    in response to the providing of the bot queries to the user, receiving, by the bot program, a user query from the user, wherein the user query is a modification of the bot queries; and
    applying, by the bot program, a solution selected by the user from one or more solutions determined by the bot program using a knowledge base.

2. The method of claim 1, wherein processing the output data of the application program further comprises:
    providing the calls database that includes data corresponding to different types of applications, wherein data of a specific type of applications includes procedures of the specific type of applications and predefined queries associated with tokens associated with the specific type of applications;
    performing, by the bot program, a recognition of a type of the application program;
    searching, by the bot program, the calls database for procedures associated with the type of the application program; and
    analyzing, by the bot program, the output data based at least in part on the procedures associated with the recognized type.

3. The method of claim 2, wherein generating the bot queries related to the status messages further comprises:
    retrieving from the calls database the queries associated with the plurality of tokens, wherein the generated bot queries are the retrieved queries.

4. The method of claim 2, further comprising:
    storing, by the bot program, the bot queries in the calls database; and
    updating the calls database based at least in part on the bot queries.

5. The method of claim 4, wherein providing the bot queries further comprises:
    providing from the calls database additional bot queries of applications associated with the application program.

6. The method of claim 1, further comprising:
    configuring the bot program to access an application program interface of the application program, wherein generating the bot queries further comprises:
        generating candidate bot queries related to the detected status messages; and
        specifying the candidate bot queries based at least in part on requests of the application programing interface, wherein the generated bot queries are the specified candidate bot queries.

7. The method of claim 1, further comprising:
    prompting the user to confirm that the user query takes into account the bot queries.

8. The method of claim 1, further comprising:
    displaying the output data in an application user interface on a display; and
    displaying the bot queries in a bot dialog window on the display, wherein the bot dialog window and the application user interface being concurrently displayed, wherein the user query is received via the bot dialog window.

9. The method of claim 8, wherein the application user interface includes a panel and a dashboard, wherein the processing of the output data comprises processing the displayed output data using the application user interface.

10. The method of claim 1, wherein the bot query includes a first query to find a root cause of the status message and a second query to provide details of the status message.

11. The method of claim 1, further comprising:
    initiating a user-bot chat session, wherein receiving of the user query, determining of the one or more solutions, and applying the selected solution occur during the user-bot chat session.

12. The method of claim 1, further comprising:
embedding the bot program in the application program.

13. The method of claim 1, further comprising:
configuring the application program to output data using a service of an application server, wherein the application program is a client in a first client-server configuration involving the application server connected to the client; and
configuring the bot program as a client in a second client-server configuration involving a bot server connected to the bot program.

14. The method of claim 1, wherein the application program is selected from a group consisting of: asset management application and network management application.

15. A computer program product for processing user queries using a bot program, the computer program product comprising one or more computer-readable storage devices and computer-readable storage media having computer-readable program instructions stored on the one or more computer-readable storage media, the program instructions comprising:
processing, by the bot program, the output data of an application program;
detecting, by the bot program, status messages in the output data;
tokenizing, by the bot program, the status messages detected by the bot program from the output data of the application program into a plurality of tokens;
searching, by the bot program, each of the plurality of tokens within a calls database to identify one or more queries associated with the plurality of tokens;
generating, by the bot program, bot queries related to the status messages from the one or more queries identified as being associated with the plurality of tokens;
providing, by the bot program, the bot queries to a user;
in response to the providing of the bot queries to the user, receiving, by the bot program, a user query from the user, wherein the user query is a modification of the bot queries; and
applying, by the bot program, a solution selected by the user from one or more solutions determined by the bot program using a knowledge base.

16. The computer program product according to claim 15, the stored program instructions stored on the computer-readable storage media further comprising:
program instructions to provide the calls database that includes data corresponding to different types of applications, wherein data of a specific type of applications includes procedures of the specific type of applications and predefined queries associated with tokens associated with the specific type of applications;
program instructions to perform, by the bot program, a recognition of a type of the application program;
program instructions to search, by the bot program, the calls database for procedures associated with the recognized type; and
program instructions to analyze, by the bot program, the output data based at least in part on the procedures associated with the type of the application program.

17. The computer program product according to claim 15, the stored program instructions further comprising:
program instructions to display the output data in an application user interface on a display; and
program instructions to display the bot queries in a bot dialog window on the display, wherein the bot dialog window and the application user interface being concurrently displayed, wherein the user query is received via the bot dialog window.

18. A computer system for processing user queries using a bot program, the computer system comprising:
one or more computer processors;
one or more computer readable storage devices; and
stored program instructions on the one or more computer readable storage devices for execution by the one or more computer processors, the stored program instructions comprising:
processing, by the bot program, the output data of an application program;
detecting, by the bot program, status messages in the output data;
tokenizing, by the bot program, the status messages detected by the bot program from the output data of the application program into a plurality of tokens;
searching, by the bot program, each of the plurality of tokens within a calls database to identify one or more queries associated with the plurality of tokens;
generating, by the bot program, bot queries related to the status messages from the one or more queries identified as being associated with the plurality of tokens;
providing, by the bot program, the bot queries to a user;
in response to the providing of the bot queries to the user, receiving, by the bot program, a user query from the user, wherein the user query is a modification of the bot queries; and
applying, by the bot program, a solution selected by the user from one or more solutions determined by the bot program using a knowledge base.

19. The computer system according to claim 18, the stored program instructions of the computer readable storage device further comprises:
program instructions to provide the calls database that includes data corresponding to different types of applications, wherein data of a specific type of applications includes procedures of the specific type of applications and predefined queries associated with tokens associated with the specific type of applications;
program instructions to perform, by the bot program, a recognition of a type of the application program;
program instructions to search, by the bot program, the calls database for procedures associated with the recognized type; and
program instructions to analyze, by the bot program, the output data based at least in part on the procedures associated with the type of the application program.

20. The computer system according to claim 18, the stored program instructions of the computer readable storage device further comprises:
program instructions to display the output data in an application user interface on a display; and
program instructions to display the bot queries in a bot dialog window on the display, wherein the bot dialog window and the application user interface being concurrently displayed, wherein the user query is received via the bot dialog window.

* * * * *